UNITED STATES PATENT OFFICE.

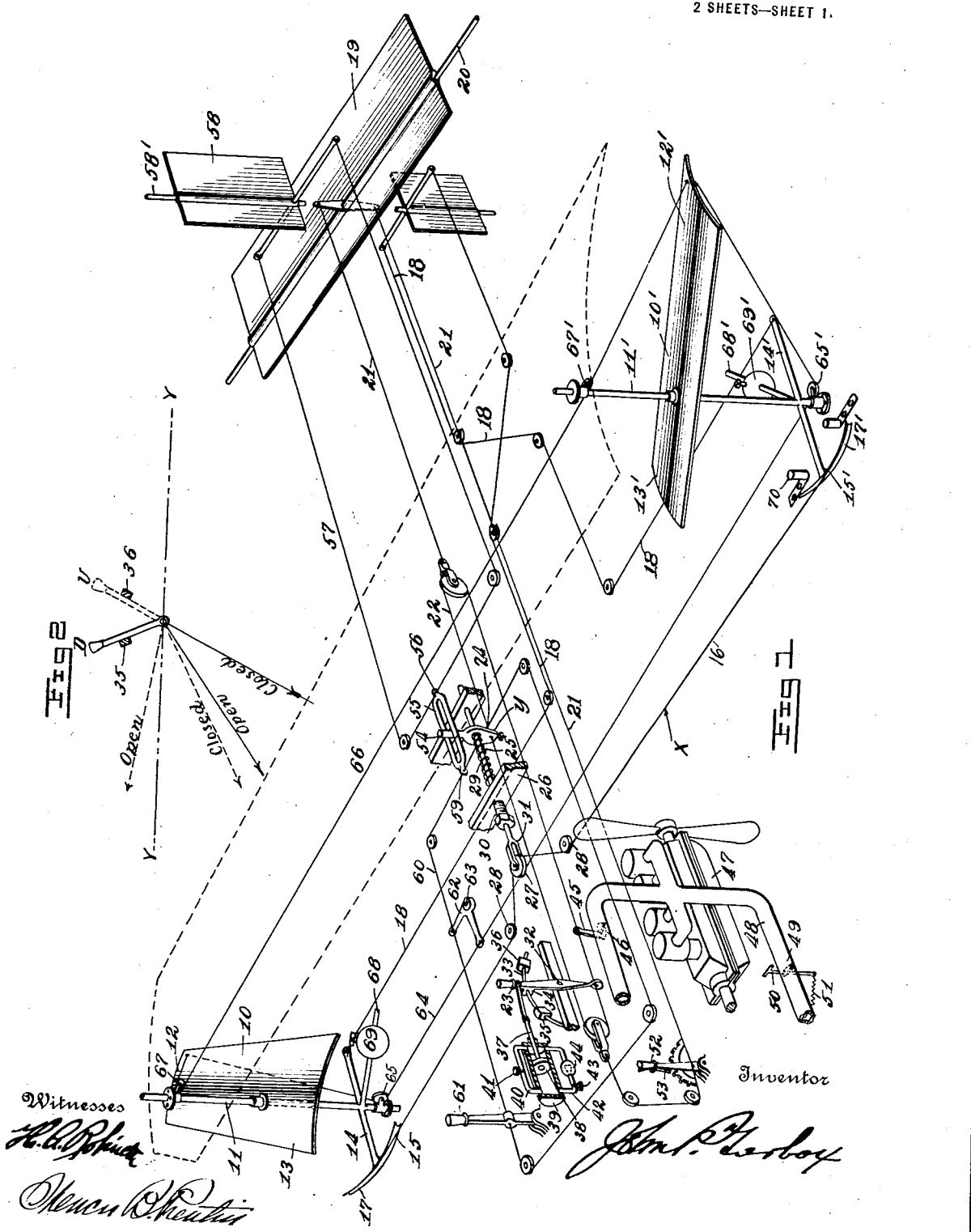

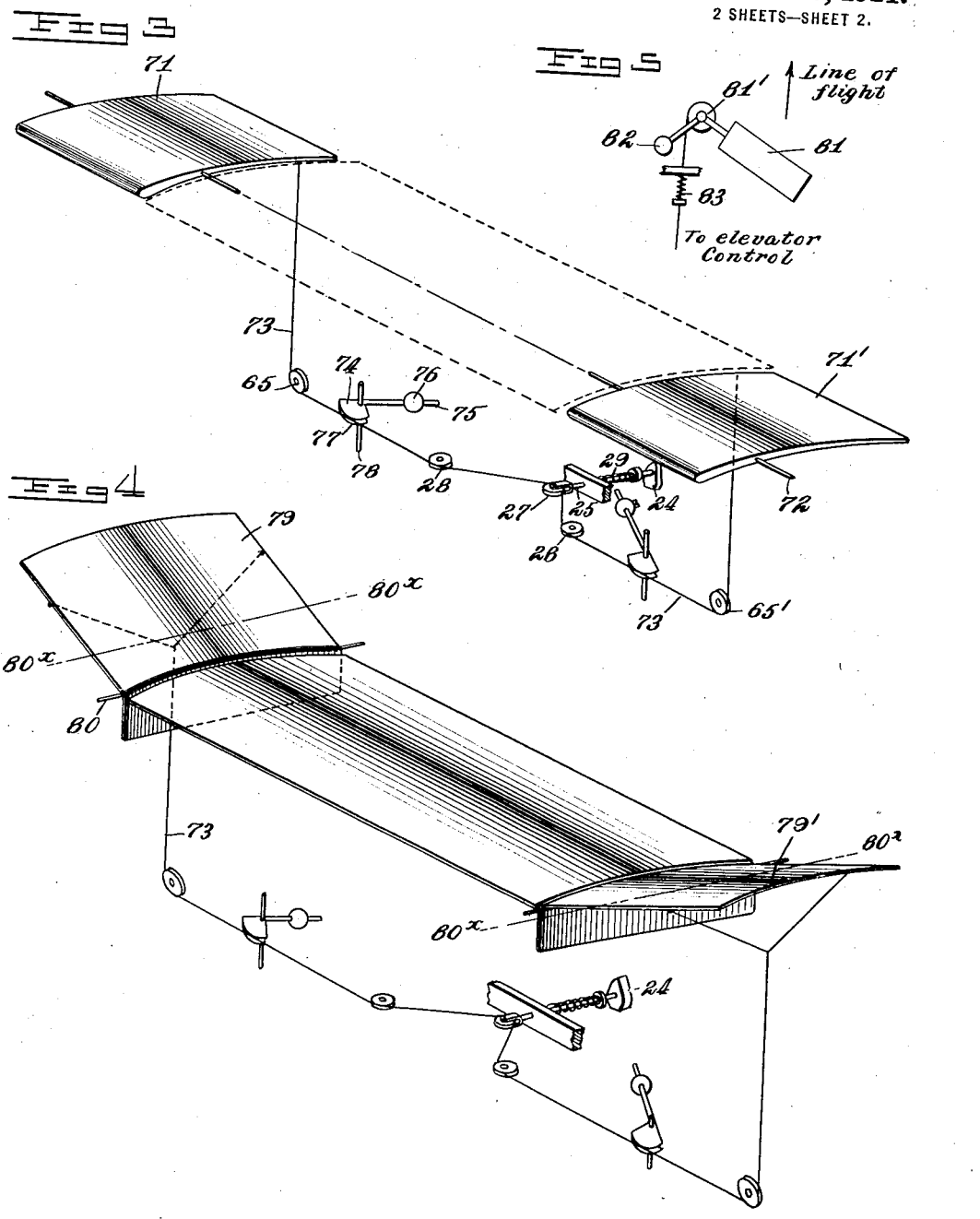

JOHN P. TARBOX, OF GARDEN CITY, NEW YORK, ASSIGNOR TO TARBOX SAFETY AIRCRAFT CO., OF WASHINGTON, DISTRICT OF COLUMBIA, A CORPORATION OF DELAWARE.

INTERLOCKING BALANCING SYSTEM FOR AIRCRAFT.

1,367,840.                  Specification of Letters Patent.       Patented Feb. 8, 1921.

Application filed June 29, 1914, Serial No. 847,999. Renewed June 3, 1920. Serial No. 386,286.

*To all whom it may concern:*

Be it known that I, JOHN P. TARBOX, a citizen of the United States, residing at Garden City, in the county of Nassau and State of New York, have invented certain new and useful Improvements in Interlocking Balancing System for Aircraft, of which the following is a specification.

My invention consists of an automatic balancing system for aircraft of any description. Its particular adaptation is for heavier-than-air craft.

The objects of the invention are manifold, but broadly stated, these objects may be said to emanate from one principle, namely, the attainment of a system which will meet a maximum number of the many variable conditions with the least complication of apparatus and the least dead weight of apparatus. I have realized largely this broad object of my invention.

The invention involves three prominent features in combination with others: one, the utilization of lifting surfaces throughout as controlling surfaces; the second, the utilization of the same lifting-controlling surfaces for regulating longitudinal balance that are used to regulate lateral balance; and third, the regulation of longitudinal balance by integration of the pressures at opposite lateral extremities of the craft. As will be seen, this latter feature of invention involves a method.

In the accompanying drawings I illustrate the best forms of my invention known to me, but it will be understood that many forms may be given the invention by those skilled in the art without in any wise departing from its generic spirit.

Of the drawings—

Figure 1 is a perspective diagrammatic illustration of the system;

Fig. 2 is a vector diagram of the directional relation of one of the principal controlling levers;

Fig. 3 is a perspective diagram of one modification; and

Fig. 4 is a similar diagram of another modification.

Fig. 5 is a still further modification.

Referring to Fig. 1, 10 and 10' are two horizontally disposed rearwardly extending lifting surfaces, one at each lateral extremity of the craft. These surfaces are mounted on vertically extending axes 11, 11', which axes are rotatably mounted in any suitable bearings, a bearing of the ball type being preferably provided at each end. The angle of incidence of surfaces 10 and 10' may be made anything desired. So also they may be positioned in a dihedral angular relation with respect to the horizontal and each other, and so also their shapes, and the number per axis 11, 11' may be varied. The axes 11, 11' may be varied slightly from the vertical, as for instance by inclining rearwardly from bottom to top. In short, the normal positions of surfaces 10 and 10' with respect to each other may be made substantially that of the normal positions of any known aeroplane surfaces in any known aeroplane construction to each other.

The outer portions 12, 12' of surfaces 10 and 10' present greater head resistance than the inner portions 13 and 13', whereby wind pressure during flight biases surfaces 10 and 10' respectively in clockwise and anticlockwise directions when viewed from above. Any suitable braces or guy wires may be provided between axes 11, 11' and surfaces 10 and 10' which they support.

Intermediate their ends axes 11 and 11' are provided with longitudinally extending bars 14 and 14', the front ends of which at least may be provided with grooved segments 15 and 15' having centers on axes 11 and 11'. Cord 16 connected by its ends to the outer extremities 17 and 17' of the segments interconnects them, and normally lies in the grooves thereof. The rear ends of levers 14 and 14' on the other hand are interconnected by cable 18. The dimensions of these connections and the relations of the bars 14, 14' to axes 11, 11' are such that the normal position of surfaces 10 and 10' is substantially as shown, and that any movement of the surfaces about their axes 11 and 11' must be in unison.

19 is an elevating rudder illustrated as at the tail of the craft. This rudder is of the balanced type, its pivotal axis 20 being located on the mean transverse line of pressure whereby it may be deflected with a minimum force. It is connected by operating cable 21 with differential cable 22, one branch of which is connected with manually operating lever 23, and the other branch of which is connected with cable 16 connecting surfaces 10, through the medium of a block 24 clamped to the cable, a longitudinally extending rod 25 passing through fixed support 26, and bearing on its outer end pulley 27 intermediate pulleys 28 over which cable 16 passes and displaced from the line of centers thereof. Intermediate block 24 and fixed support 26 is a compression spring 29, the pressure of which may be adjusted freely by means of thimble 30 threaded into the support and surrounding the rod 25, as does also compression spring 29. Pulley 27 is preferably mounted on ball bearings in the fork 31 at the front end of rod 25.

Lever 23, aforementioned, which connects to the opposite side of differential cable 22 is mounted on fixed pivot 32 and provided with sufficient friction in or about the pivot to retain it in whatever position it may be adjusted in a manner similar to the well known Wright control levers. Other suitable means may be used for this purpose, such for instance as the common rack and latch. The upper end of the lever in fact sweeps over a fixed segment 33, which may be formed to serve as such a rack if desired, or the part 33 may be passed through an aperture 34 in lever 23, and the walls of the aperture may bear frictionally upon the surfaces of the segment. The segment 33 carries two normally fixed but adjustable stops, the one 35 in front of the lever, and the other 36 in the rear thereof, whereby the range of movement of lever 23 is limited. Connected with lever 23 by rod 37 is the piston 38 of a dashpot 39. Regulation of this dashpot is effected through two bypasses, the one 40 containing the simple throttle valve 41, and the other 42 containing in addition to a simple throttle valve 43 a check valve 44 opening on forward movement of piston 38 only. If desired a check valve similar to 44 may be included in bypass 40 and opening only on rearward strokes of piston 38. The chamber of dashpot 39 is filled with oil or other fluid.

Connected with the same branch of differential cable 22 with which lever 23 is connected is throttle lever 45 operating throttle 46 of the engine 47. Arranged in a bypass 48 of throttle 46 is a throttle 49 operable by foot or hand lever 50, but retained normally closed by spring 51. The two throttles 46 and 49 may be fed from the same carbureter or from separate carbureters as desired, the essential being that the one controls the fuel supply to the driving motor 47 separately from the other.

Connected directly with the main operating cable 21 of the elevating rudder 19 is an operating lever 52 normally retained in an inactive unlocked position as shown. Latch 53 is used for locking it in position when desired. This latch may be of any suitable form, but should preferably be such that it is unlocked when the lever is grasped.

Connected with cable 16 which interconnects surfaces 10 and 10' and mounted on block 24 is a shiftable fulcrum or pivot 54 upon which is fulcrumed a slotted lever 55, the pivot 54 projecting through the slot. One end of this lever 55 is connected with the operating cables 57 of vertical rudder 58, while the other end 59 is connected with cable 60 extending to and connecting with steering lever 61.

A bell crank 62 is pivoted to fixed point 63 and connects by one arm with cable 60 and by the other with cable 64 which extends between axes 11, 11', and over pulleys 65, 65' located closely adjacent to axes 11, 11' to the lateral extremities of surfaces 10 and 10'. These lateral and rearmost extremities are made flexible whereby they may be warped by moving cable 64. The complemental cable 66 interconnects the top sides of the lateral extremities aforementioned, passing over upper pulleys 67, 67' located closely adjacent the upper ends of axes 11, 11'. These connections constitute means to vary the relative drift on surfaces 10, 10'.

Located on the opposite sides of axes 11, 11' from the portions 12, 12' having greatest head resistance, as respects the line of flight, and supported adjustably upon rearwardly extending arms 68, 68' inclined toward the longitudinal axis are weights 69, 69'. The arms 68, 68' preferably make an angle of approximately 45° with the longitudinal axis when in their normal positions, but this may be varied to suit various conditions.

Assuming the aircraft to be in flight, the operation of the system of my invention is as follows: The craft having been directed in its flight in a horizontal plane, and having been balanced in that plane both laterally and longitudinally, the various balancing and steering devices occupy approximately the positions illustrated, surfaces 10, 10' being approximately at an angle of 45° in general direction to the longitudinal axis of the craft. These positions they maintain as long as the craft is undisturbed by internal or external conditions. Any variation in pressure between the opposite lateral extremities of the craft, which variation might cause unbalancing, is promptly detected, and the unbalancing anticipated and prevented in a large measure by the movement of surfaces 10, 10' about their axes (looking from the top and with reference to their extremities), toward the low pressure side of the craft. This movement takes place rapidly, but continues positively until the opposing head resistances of the lateral extremities 12, 12' are equalized through cable 16. If unbalancing actually takes place, due to very sudden disturbance which may not be wholly compensated for, the weights 69, 69' assist the equilibrated pressures in moving surfaces 10, 10' toward the low pressure side. The mass of the weights 69, 69' will naturally be varied with different machines, and may be made as small or as great as desired, and moreover may be set at any desired radius distance from the axes 11 and 11'. This movement of surfaces 10 and 10' increases the lifting force on the low pressure side, and simultaneously decreases the lifting force on the high pressure side.

When steering lever 61 is moved to right or left, vertical rudder 58 is operated to steer the craft right or left, and through this steering operation, the extremities 12, 12', of surfaces 10, 10', are oppositely warped by reason of connections 62, 64, 66 to vary the relative drift of the surfaces to bank the craft for the turn and maintain it at the proper angle of bank. The difference in drift causes movement of surfaces 10, 10' to vary the relative torques about the longitudinal axis in the direction necessary to establish the bank. During these steering movements, cable 57 is operated from cable 60 through movement of lever 55 about shiftable pivot 54.

By reason of the connection of shiftable pivot 54 with cable 16, this pivot is shifted as the tension in cable 16 varies, the arrangement being such that when the tension in cable 16 increases, the movement of rudder 58 for a given movement of lever 61 is increased, and when the tension in cable 16 decreases the movement of rudder 58 from lever 61 is decreased. The tension in cable 16 varies as the air speed of the machine varies under normal conditions, and is at all times proportional to the algebraic sum of the pressures upon the surfaces 10 at the opposite lateral extremities of the craft. Thus under normal conditions when there is a variation in pressure between the lateral extremities of the craft, these two pressures are integrated through cable 16. The tension in cable 16 therefore represents truly the resultant pressure conditions of the entire path traveled by the craft, and therefore furnishes a far more accurate as well a far more powerful controlling agency than does any pressure upon a localized surface of limited extent. Furthermore the normally active lifting surfaces 10, 10' which themselves constitute the lateral balancing devices, are the surfaces through which this controlling force is derived. There is therefore absolutely no extra drag whatsoever on the craft, and no extra weight such as would be necessary in case special auxiliary surfaces normal to the line of flight were provided for the derivation of this controlling force.

The function served by the shiftable pivot 54 is a most important one. When the speed of the craft is too low to warrant a sharp turn, it is impossible for an operator to make such a turn by reason of the fact that pivot 54 is shifted to such position as to decrease the angle of movement of rudder 58 to the maximum safe value. Moreover in flight in a direction parallel to the direction of the wind, in making a sharp turn, when the pressure suddenly gives way, the angle of the turn will be automatically decreased if dangerous by reason of the shifting of pivot 54, the rudder 58 being shifted by reason of such movement of the pivot and irrespective of the then position of lever 61. Rudder 58 like rudder 19 is approximately balanced about its axis 58', whereby it may be operated with minimum power. Obviously this arrangement absolutely prevents dangerous turns under all unsafe air speed conditions. If desired suitable stops may be placed in the path of steering lever 61 to limit its range of movement.

The tension of spring 29 is so adjusted that during the normal flight, the tension of cable 16 is just sufficient to maintain elevating rudder 19 in normal position against the tension of spring 29. In case of any longitudinal unbalancing, there is variation in pressure upon surfaces 10 and 10' with the result that the tension in cable 16 is increased or decreased. If increased, the tension of spring 29 is overcome to a greater extent than normal, this moving rudder 19 upwardly to direct the craft upwardly at an increased angle, and if tension in cable 16 is decreased, the craft is directed downwardly by a reverse action. This changes the direction of flight, and flight in the changed direction continues until the change in air speed of the craft is such as to restore the tension in cable 16 to its normal value whereupon the rudder 19 is returned to its normal position. As pointed out above, the surfaces 10, 10' constitute a most efficient means of measuring the air pressure in the path of flight of the craft as a whole, and like vertical rudder 58 elevating rudder 19 is operated in accordance with the resultant pressure conditions. Not only is unbalancing corrected after it ensues (the change of direction bringing about or augmenting pressure variation), but unbalancing is anticipated, and at least partially compensated for before it occurs. Moreover, a pressure variation on one lateral extremity of the craft which is not present upon the and which may be entirely missed by a localized anemometer device, will be detected and compensated for. Moreover, both upwardly and downwardly directed air currents, though they may not immediately bring about a change in the air speed of the craft, or in the incidence of the principal supporting surfaces, are at once detected and resultant unbalancing anticipated. This is by reason of the fact that upward and downward currents have opposite effects upon the surfaces 10, 10'.

In this operation, the weights 69, 69' serve a very important function. By reason of their location on the opposite side of the axes 11, 11' from the pressure measuring surfaces 12, 12', as respects the planes of the axes, during acceleration or retardation of speed, all "hunting" or oscillation of the surfaces 10, 10' due to sudden changes of speed is avoided. This is by reason of the fact that the sudden changes of pressure upon the surfaces 10, 10' are counteracted by the inertia of weights 69, 69', the direction of these sudden and temporary forces being in opposite directions about axes 11, 11'. They both vary approximately as the same function of the air speed of the craft, $i.$ $e.$, as the square of the rate of change of the speed or of velocity. By reason of this compensation for the inertia by the location of weights 69, 69', and the arrangement of the weights, gravity acts upon them in a direction to combine the force of gravity with the pressure upon surfaces 10, 10' so that they act in conjunction to bring the craft back to its normal position. A moment's consideration will make these points clear. For instance, in a downward dive of unbalancing, not only is the tension in cable 16 increased by reason of an increased air speed, but also by the action of gravity tending to draw the weights 69, 69' into the transverse plane of the axes 11, 11'. The reverse is true upon sudden climbing which might stall the machine. Still further the weights 69, 69' take care of all slight rocking movements of which the craft may partake without such variation in pressure as would effect correction through the surfaces 10, 10', for just as soon and just as long as the craft is unbalanced longitudinally to any degree, the weights 69, 69' exert an abnormal force about axes 11, 11' in a direction to return the craft to normal. I regard this as a highly important feature of my invention, and believing that I am the first to utilize it in the combination set forth, I shall claim the same broadly.

At any time during the flight of a machine, the angle of flight may be changed at will by simply moving lever 23 to a position indicative of the desired angle and allowing it to remain there. The craft will thereupon automatically take and maintain the new angle of flight. This results by reason of the fact that when elevating rudder 19 is moved from its normal position, the air speed of the craft is changed with the change in direction of flight, being increased when the craft is pointed downwardly and decreased when the craft is pointed upwardly. This change in air speed produces just that change in the tension in cable 16 which is necessary to return rudder 19 to that angle necessary to retain the craft in the attitude desired, whereupon further change in the direction of flight is prevented, and the craft is automatically balanced in the new direction of flight in the same manner as it is balanced in the normal horizontal flight above described. In short, the effect of moving lever 23 is to change the normal tension (and by normal tension is meant that tension present when rudder 19 is in normal position) of spring 29. To take a specific example, if lever 23 is moved forwardly, rudder 19 is deflected downwardly to turn the craft down, and as the craft turns downwardly, its air speed increases, and increases the tension in cable 16 sufficiently to return rudder 19 to its new angle against the pressure of spring 29, which pressure is increased and maintained in an increased condition as long as the machine travels upon its new line of flight.

Stop 35 is set at such a position that when lever 23 is moved against it, the craft takes the maximum safe angle of downward flight with the throttle closed. This is clearly illustrated in Fig. 2. Stop 36 on the other hand is set in such a position that when lever 23 is pulled back against it, the craft takes its maximum safe angle of upward flight with the throttle open. If the throttle is closed while the lever is in position U against stop 36, the craft is automatically started downwardly at a safe angle, as indicated by the dotted arrow marked "closed." If while the lever 23 is in position D against stop 35, the throttle is opened, instead of taking the direction of the full line arrow marked "closed," the craft will automatically take the direction of the full line arrow marked "open." The positions of the lines of flight set forth of course will vary widely with different machines, and I do not pretend to fix them with relation to each other or for any particular craft, the purpose of Fig. 2 being simply to point out the wide range of control possible with absolute safety through the use of control lever 23 and the fixed safety stops 35, 36.

Throttle 46 is so connected with cable 22 that when lever 23 is moved to position U to direct the craft upwardly, the throttle is open, and when it is moved to or toward position D, the throttle is closed or partially closed, whereby the air speed of the craft is maintained at a substantially uniform value fuel economized, and safety increased. If, due to any abnormal or emergency conditions, greater speed than is given by lever 23 in any intermediate position is desired, the operator has only to open throttle 49 by operating foot lever 50 to the desired extent. Further, also, if during any emergency condition, it is desired to alter the normal adjustment and take entire manual command of the machine, the operator has only to grasp lever 53 and operate elevator 19 to any extent desired. Between lever 23 and throttle 49, so wide a range of control of both direction of flight and air speed is possible, that there is normally absolutely no need for disturbing the emergency control lever 53.

By reason of the connection of dash-pot 39 with lever 23, the rate of movement of lever 23 both forward and backward may be adjusted to any desired value by simply adjusting the throttle valves 41 and 43 in the by-passes 40 and 42. Preferably this dash-pot is adjusted to permit free forward movement but retarded backward movement only. The sudden bringing up of the machine at the foot of a long dive may therefore be prevented. The retarding action may be made sufficient to prevent such movements of the machine and the well known disastrous results without hampering the operator in starting the machine in any manner whatsoever. Slight retarded forward movement in turning the craft down may also be desired under certain conditions.

Necessarily in illustrating the system of my invention, the apparatus has been given very irregular and abnormal relative proportion. It will be obvious, however, that the actual working part of the apparatus comprising the several levers, the tension spring 29, and the pulleys and cables will be of the usual size and proportions, and will so far take the place of the present operating cables and levers, that there will not be increase in the weight of the controlling apparatus carried by the machine over and above that now employed, and moreover the apparatus will be so disposed and of such size as not to attract special notice in the eye of the casual observer. Dash-pot 39 which appears of abnormal size, will be only an inch or two in diameter, and so stowed away against the side of some beam that it is altogether out of the way and if desired altogether out of sight.

Further it will be noticed that so far does this system go toward meeting the practical conditions of service, that once levers 61 and 23 have been set to their proper positions defining the course of flight desired, it is not necessary for the operator to pay further attention to the balance or to the course of the craft until he again desires to change the course, and at no time does he have to concern himself with the matter of balance. He may in fact move about the craft freely in the central space without disturbing the balance, so closely does this system incorporate in the craft inherent balance.

Stops 70 are provided in the path of one of the arms 14 for the purpose of limiting the degree of angular movement of surfaces 10, 10'. These stops are made adjustable as shown, and have been found a very valuable feature of the combination in that under severe disturbances, the surfaces 10' are prevented from overthrowing. Their range of movement should be approximately 90°, 45° each way from normal position.

In Fig. 3 I show one modification of which my invention is susceptible, and in Fig. 4 another. In Fig. 3 instead of using surfaces 10, 10' mounted on vertically extending axes, surfaces 71 and 71' mounted on transversely extending axes 72 are used. The axes 72 are slightly in advance of the mean line of pressure on the surfaces, the resultant controlling pressure being changed by varying the position of axes 72 as respects these lines of pressure. Surfaces 71, 71' are interconnected by cable 73 which drops downwardly and then passes over a set of pulleys essentially the same as the set 27, 28, and bearing the same reference numerals. Cable 73 is however, connected, on each side of pulleys 28, to a vertically pivoted segment 74 having connected therewith an inwardly extending arm 75 carrying adjustable weight 76. These arms 75, as in case of the arms 68, make an angle of approximately 45° with the longitudinal axis of the craft and are rearwardly and inwardly extending. Cables 73 may pass entirely around segments 74 in grooves 77 on the face thereof, or the cable may be broken and adjacent ends secured to opposite ends of the front face of the segment in each case. In either event rotation of segment 74 does not change the length of cable 73, nor does it change the leverage thereof as respects the vertical pivot 78. The operation is in all respects similar to that of Fig. 1 except as regards the surfaces 71, 71' and their movements. These surfaces move through a much smaller range, the one up when the other moves down, and vice versa. But the pressures are integrated and the resultant imposed upon spring 29 as in case of the form shown in Fig. 1. It is understood, of course, that the horizontal rudder 19 is connected with block 24 as in case of Fig. 1.

The form of Fig. 4 differs from the other two forms in that the pressures on a pair of surfaces 79, 79' pivoted on longitudinally extending axes 80 (or 80$^x$) and normally occupying positions at a dihedral angle to each other, are integrated through cable 73. Connected with cable 73, in essentially the same manner as outlined in Fig. 3, are adjustable weights 76 on arms 75 which move back and forth as the surfaces 79, 79' move back and forth. The integrated forces are applied as before to block 24 and through block 24 to the elevating rudder 19.

In either the form of Fig. 3 or that of Fig. 4, it is quite obvious not only that the weights 76 act to move the balancing devices to restore lateral equilibrium of the craft, but they also upon longitudinal unbalancing act in a fore and aft direction to increase or decrease the resultant tension in the central part of cable 73 (which corresponds to cable 16, Fig. 1) to increase or decrease the corrective angle of movement of the horizontal rudder 19.

In Fig. 5 I show a more simple form of my invention which may be used to control a power operated mechanism. It consists of a vertically extending axis 81', rigidly connected with which are a vane 81 lying on one side, and a weight 82 on an obliquely extending arm at the other side, both the vane and the weight being rearwardly extending and making an acute angle with the longitudinal line passing through the vertical axis. Together they act against the pressure of a spring 83. Longitudinal balance may be effectually preserved by such a standard. Obviously power operated mechanism may be used in connection with my invention, the various governing surfaces being then used simply as standards of position, and auxiliary rudders or other balancing devices being provided for operation by the power operated mechanism as disclosed in my application Serial No. 746,919. In such event, the power operated lateral balancing mechanism will connect with the control elements of this system at the point marked $x$, and the power operated longitudinal mechanism will connect with this system at the point marked $y$, or their equivalent. It is well understood of course that the controlling elements of the various mechanisms are the parts to be connected at the points specified, such for instance as a valve of a fluid pressure mechanism, the controlling switch of an electric mechanism, and the controlling relay or clutch of a mechanical mechanism.

Recognizing the fact that many changes may be made in my invention by those skilled in the art without departing from the generic spirit thereof, I wish it understood that the annexed claims are intended to cover all such modifications thereof as do not fall without its generic spirit.

With the foregoing understanding of my invention it will be apparent that the lateral balance of the craft is secured through a continual process of differentiation between the head pressures at the aforesaid lateral extremities of the craft, the rotative movement of the surfaces about their axes taking place as a result of measured differences in pressure between the lateral extremities. On the other hand the fore and aft balance is secured by a continuous integration of the pressures at the opposite lateral extremities, the summation of these pressures at any instant determining the course of the craft in the vertical plane. Applicant believes he is the first to combinedly operate longitudinal and lateral balancing devices according to this method, and accordingly he claims the same as fully as the law warrants.

What I claim is:

1. A balancing system for aircraft comprising pressure registering means at a plurality of spaced points on the craft, an integrating device connected therewith and arranged to integrate the pressures thereof, gravity actuated means also connected with said integrating device for the co-integration of the forces of gravity and an elevating rudder operated through said integrating device.

2. A balancing system for aircraft comprising pressure registering means at a plurality of spaced points on the craft, gravity actuated means arranged to exert a force proportional to the departure of the craft from the horizontal plane, an integrating device to which the aforesaid elements are commonly connected for the co-integration of the forces exerted thereby, and a vertical course controlling device connected with said integrating element for control therethrough.

3. A standard of position for an aircraft comprising a pressure registering device subject to varying pressure of the air rush, a mass associated therewith and arranged to exert its forces of inertia on change in absolute velocity of the craft in opposition to increase and decrease of pressure of said device due to changes in relative velocity of the craft, but which mass is acted upon by gravity to exert forces in conjunction with increase and decrease of pressure, a thrust measuring device connected with said apparatus to measure the resultant forces thereof together with a directional control member for said craft operated thereby.

4. In an aircraft, an anemometer device at each of a plurality of separated points on the craft, integrating means connected with the same and arranged to integrate the pressures measured thereby, a mass connected with said integrating means and acted upon by gravity when the vertical course of the craft is changed to vary the resultant integration, and a means for steering up and down operated from said integrating means.

5. In an aircraft, a lifting surface at each lateral extremity of the craft normally biased transversely of the line of flight by head pressures and connected together to partake of such transverse movement in unison, a mass connected with said surfaces and acted upon by gravity to vary the tension in said connection according to the inclination of the longitudinal axis of the craft, tension measuring means associated with said connection, and means to steer the craft up and down connected with said measuring means for control thereby.

6. In an aircraft, a lifting surface rotatable about a vertically extending axis at each lateral extremity of the craft, normally biased transversely of the line of flight by head pressures and connected together to partake of such transverse movement in unison, masses radially mounted on said axes on the opposite side of the longitudinal plane thereof in each case from the center of pressure of the surface, tension measuring means for said connection, and means for steering the craft up and down, controlled by said tension measuring means.

7. In an aircraft, a lifting surface at each lateral extremity of the craft, rotatable about a vertically extending axis, biased by head pressure about said axis transversely of the line of flight and connected together to partake of such movement in unison, a mass connected with one of said axes on a radius making an acute angle with the longitudinal plane of the axis and longitudinally in the rear thereof, a tension measuring means associated with said connection, and means to steer the craft up and down controlled by said measuring means.

8. In an aircraft, main supporting surfaces, an auxiliary lifting surface adjacent each lateral extremity of the craft, rotatable about a vertically extending axis and normally biased transversely of the line of flight by head pressures and connected together to partake of such movement in unison, and a mass connected with said surfaces radially of a vertically extending axis about which it is movable and at an angle to the longitudinal plane of the axis thereof.

9. In an aircraft, an anemometer device comprising a normally active supporting surface responsive to the air speed of the craft, means for steering the craft up and down, manual control means therefor, and a three point differential connection, between said anemometer device, said steering means and said manual control, whereby the normal relation between said anemometer device and said steering means may be altered at will and said manual means may be set to determine and indicate the inclination of the craft.

10. In an aircraft, a main body, a supporting surface arranged to move with respect to said main body in response to variations in pressure thereon, means for steering the craft up and down operated automatically through movement of said supporting surface, together with manual means for said steering means arranged to modify the control of said supporting surface thereover without removing said steering means from such control.

11. In an aircraft, automatic balancing means arranged to be set to maintain the craft in various angular relations with respect to the horizontal, a driving motor, motor controlling means therefor, and means connecting said motor controlling means with one of the set parts of said automatic balancing mechanism whereby said motor controlling means is set in positions coördinate with the angle at which the craft is maintained.

12. In an aircraft, an anemometer device responsive to the air speed of the craft, means to steer the craft up and down connected directly with said device for operation thereby, and manual control means for said steering means connected therewith to operate the same independently of actuation of said anemometer device, a driving motor for the craft, and motor control means therefor operated by the aforesaid manual control means.

13. In an aircraft, an anemometric device responsive to the air speed of the craft, means to steer the craft up and down connected with said device for operation thereby, an additional and manual control device for said steering means, a driving motor for the craft, a motor control means therefor connected with said manual control device for operation jointly therewith.

14. In an aircraft, steering means, manually operated directional control means therefor, and a retarding time limiting device connected with said control means and arranged to limit the minimum time of operation thereof.

15. In an aircraft, an anemometer device, means to steer the craft up and down controlled by said anemometer device, a manual control member for said steering means independent of actuation of said anemometer device, a driving motor, motor control means connected with said manual control member for operation thereby, and additional motor control means operable to control the motor independently of said manual control member of the steering means.

16. In an aircraft, a movable member adapted to occupy positions changed in the adjustment of the longitudinal inclinations of the craft, a driving motor, motor control means connected with said part for operation thereby, and additional motor control operable independently of said part.

17. In an aircraft, a movable member adapted to occupy positions changed in the adjustment of the longitudinal inclinations of the craft, a driving motor, a throttle therefor operated from said part, and a second throttle operable independently of the first and feeding said motor in multiple therewith.

18. In an aircraft in combination, main supporting surfaces, a normally active lifting surface biased by the pressure transversely of the line of flight, elastic means normally opposing such movement, a mass connected with said surface from the opposite side of the line of flight passing through its mounting, and a longitudinal balancing device connected with said surface and operated thereby.

19. In an aircraft in combination, main supporting surfaces, steering means, manual control means therefor, connections between the manual control means and the steering means including a lever, an anemometer device responsive to the air speed of the craft, and a fulcrum shiftable longitudinally of said lever connected with said anemometer device and operated thereby.

20. In an aircraft, in combination main supporting surfaces, means for steering right and left, and a wind pressure responsive device governing the degree of actuation thereof.

21. A directional control system for aircraft comprising a directional control rudder for controlling the horizontal course of the craft and anemometric means arranged to modify the degree of actuation of said steering means.

22. A directional control system for aircraft comprising a directional control member, anemometric means defining the range of operation of said control member without effecting actuation thereof, together with actuating means for said member arranged to actuate it through the determined range.

23. An air craft comprising a main supporting member which constitutes the lifting body of the craft, a balancing device upon each side of said main supporting member and presenting coöperating surfaces arranged to be normally acted upon in flight by air pressure, to produce torque in opposite directions about the longitudinal axis of the craft, said balancing devices being connected to each other and each responsive to temporarily preponderating pressure thereon to increase the torque of the other, and means to warp said surfaces to vary the relative torques thereon.

24. In an aircraft, an automatic balancing system including a lever through the setting of which the craft is maintained in attitudes corresponding with the position of the lever, a driving motor, a throttle, and connections between said throttle and said lever coördinating the setting of the throttle to the maintained attitude of the machine.

25. A balancing system for aircraft comprising pressure registering means at a plurality of spaced points on the craft, and integrating devices connected therewith arranged to integrate the pressures thereof, a standard of position of the craft with respect to the earth's surface also connected with said integrating devices for the cointegration of the forces of gravity, and an elevating rudder operated through said integrating devices.

26. In an air craft in combination, main supporting surfaces, a normally active pressure registering device biased by pressure of the air rush transversely of the line of flight, elastic means normally opposing such movement, a standard of position with respect to the surface of the earth connected with said pressure registering device on the opposite side of the line of flight passing through its mounting, and a longitudinal balancing device connected with said elements and operated jointly thereby.

27. An aircraft comprising a main supporting member which constitutes the lifting body of the craft, a balancing device upon each side of said main supporting member and presenting coöperating surfaces arranged to be normally acted upon in flight by air pressure, to produce torque in opposite directions about the longitudinal axis of the craft, said balancing devices being connected to each other and each responsive to temporarily preponderating pressure thereon to increase the torque of the other, and drift varying means connected with said surfaces to effect movement thereof about their axis to vary the relative torques thereof.

28. In a balancing system for aircraft comprising pressure registering means at a plurality of spaced points on the craft, and integrating means connected therewith and arranged to integrate the pressure thereof, said pressure registering means having a mass acted upon by gravity to effect cointegration of the forces of gravity, and an elevating rudder operated through said integrating devices.

29. A standard of position for an aircraft comprising a pressure registering device subject to varying pressure of the air rush and having a mass arranged to exert its forces of inertia on change of the absolute velocity of the craft in opposition to increase and decrease of pressure of said device due to changes in relative velocity of the craft, but which mass is acted upon by gravity to exert forces in conjunction with increase and decrease of pressure, and a thrust measuring device connected with said apparatus to measure the resultant forces thereof, together with a directional control member for said craft controlled thereby.

30. In an aircraft, directional steering means, and manually operated control means therefor having unrestricted forward movement and a restricted return movement and connected with said steering means to retard the rate of movement thereof to steer upwardly while permitting unrestricted movement thereof to steer downwardly.

31. In a balancing system for aircraft comprising air rush pressure registering means, said device having associated therewith a means arranged to be acted upon by gravity to register a force proportional to the inclination of the craft with respect to the earth, the arrangement being such that the force of gravity and the force of the air rush are integrated, and an elevating rudder controlled through application of said integrated forces.

32. Standard of position for an aircraft comprising a pressure registering device subject to varying pressure of the air rush and having a mass arranged to exert its forces of inertia on change of the absolute velocity of the craft in opposition to increase and decrease of pressure of said device due to changes in relative velocity of the craft, but which mass is acted upon by gravity to exert forces in conjunction with increase and decrease of pressure, a thrust measuring device connected with said apparatus to measure the resultant forces thereof together with a directional control member for said craft controlled thereby, and manual control mechanism to operate said control member.

33. A balancing system for aircraft comprising pressure registering means at a plurality of spaced points on the craft, means differentiating said pressures governing the lateral balance of the craft, said devices having a mass connected therewith arranged to cointegrate with said pressures a force proportional to the inclination of the craft to the horizontal, and manually operable means to effect alteration of the differential action of said registering means to bank the craft.

34. In an aircraft, a balancing system comprising a rudder by which the craft may be steered, operating means therefor, a movable part connected to said operating means and movable thereby proportionally, propelling means for the craft, a power controlling device for said propelling means, and connections between said movable part and said power controlling device.

35. In an aircraft, a driving motor, control means therefor, a longitudinal balancing device, an operating lever therefor having operative connection with said balancing device adapting it to be moved to and retained in a position indicative of the longitudinal inclinaton of the craft, and connections between said operating lever and said power controlling means.

36. In an aircraft, a balancing system comprising a balancing device, means for operating the same, a driving motor acting in the line of flight, power controlling means therefor, a movable part moved when the craft moves from normal and retained in a position indicative of the abnormal position of the craft, and operating connections between said movable part and said power controlling means.

In testimony whereof I affix my signature in presence of two witnesses.

JOHN P. TARBOX.

Witnesses:
NANCY C. LOENTAL,
H. H. LOWENSTEIN.